Nov. 10, 1931.  I. O. PEDERSEN ET AL  1,831,634
APPARATUS FOR SURFACING SHEETS OF GLASS AND THE LIKE
Filed Aug. 24, 1927   2 Sheets-Sheet 1
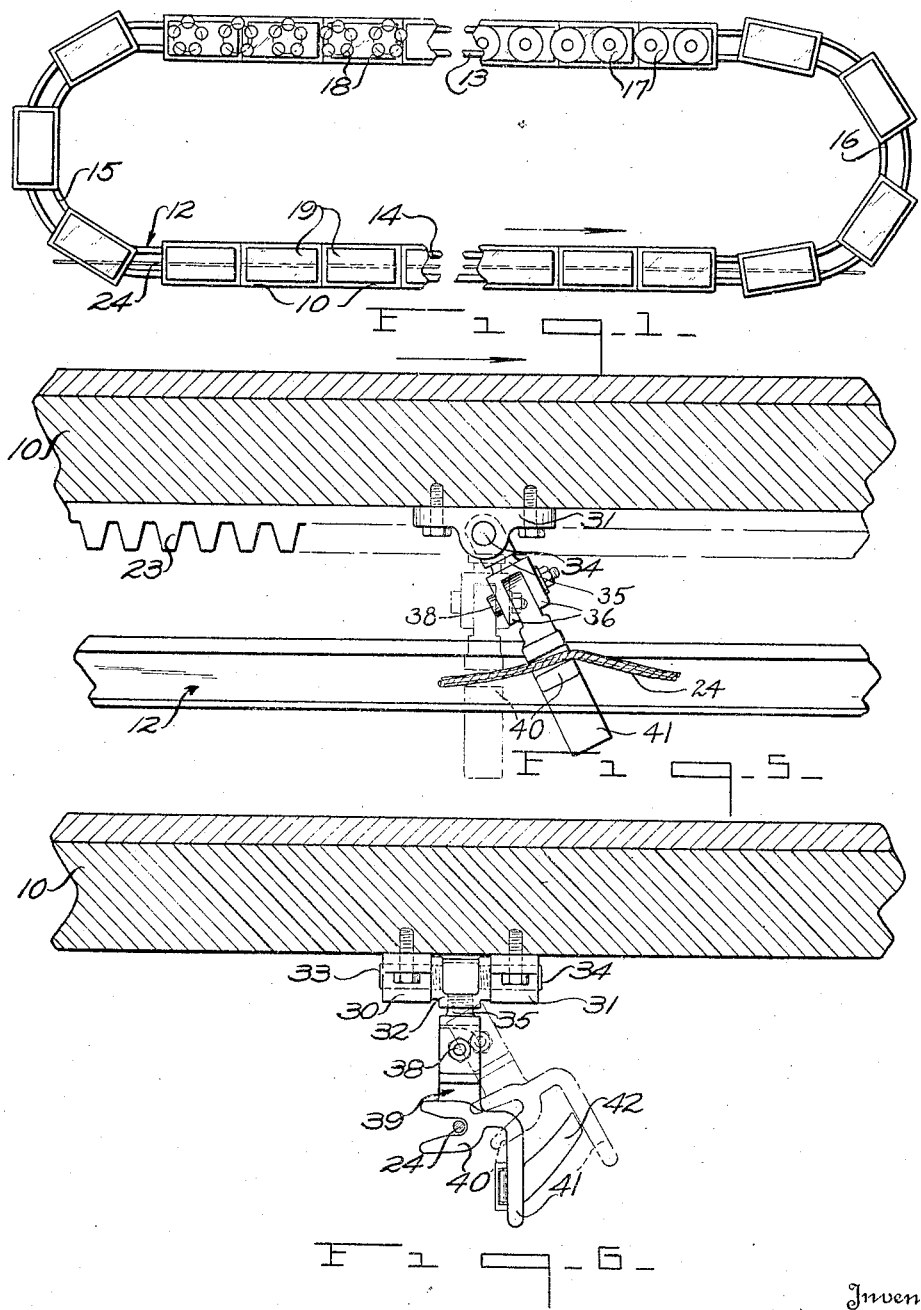
Inventor
Ingvald O. Pedersen
Erik G. Stahle
By Frank Fraser
Attorney

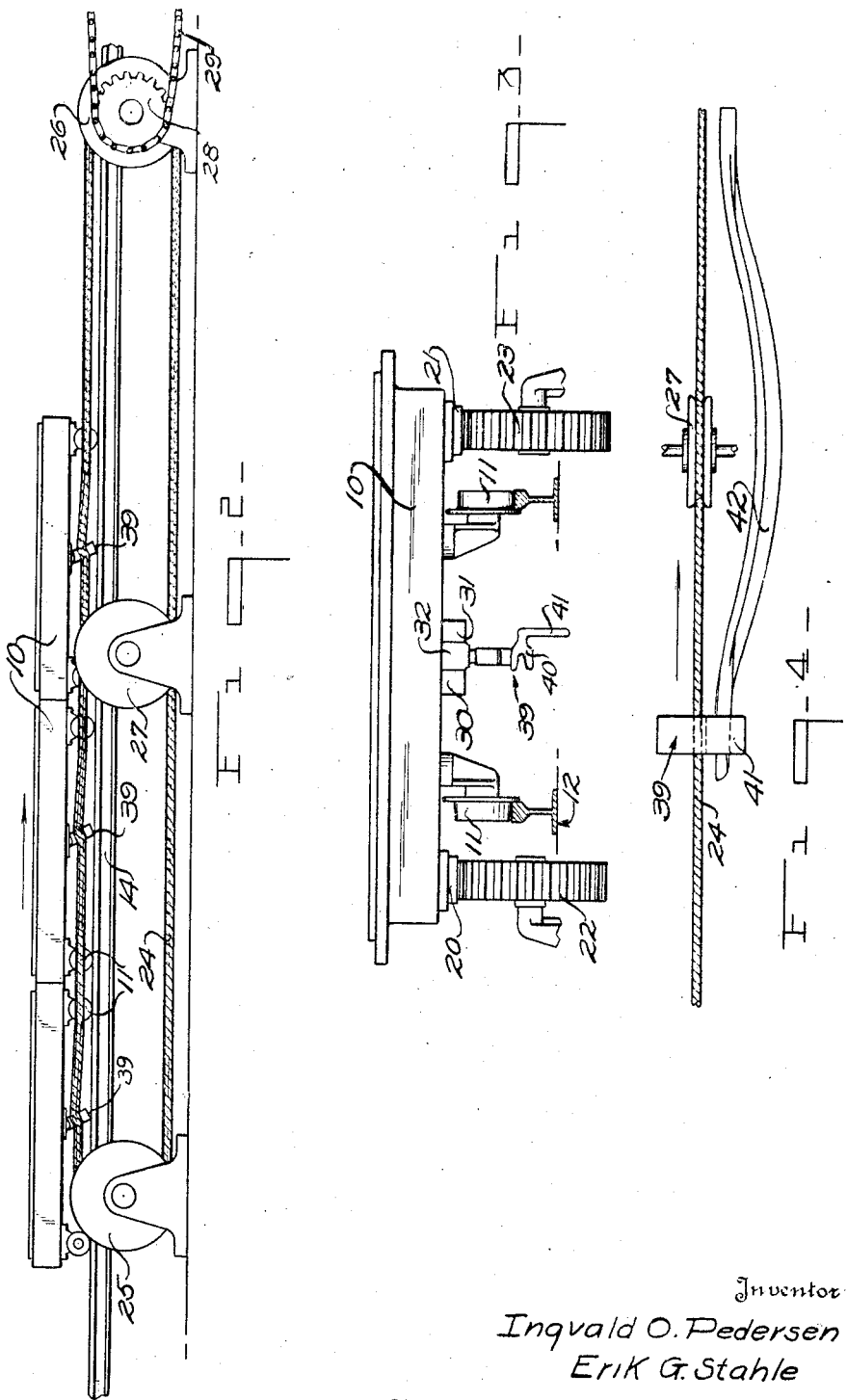

Patented Nov. 10, 1931

1,831,634

UNITED STATES PATENT OFFICE

INGVALD O. PEDERSEN AND ERIK G. STAHLE, OF PITTSBURGH, PENNSYLVANIA, ASSIGNORS TO LIBBEY-OWENS-FORD GLASS COMPANY, OF TOLEDO, OHIO, A CORPORATION OF OHIO

APPARATUS FOR SURFACING SHEETS OF GLASS AND THE LIKE

Application filed August 24, 1927. Serial No. 215,053.

This invention relates broadly to surfacing apparatus and more particularly to the grinding and polishing of glass sheets or other flat plates.

The present invention is especially adapted for use in connection with the so-called continuous process for surfacing sheet glass wherein the glass sheets mounted upon a plurality of trucks or tables are adapted to be carried first beneath a series of grinding units and then beneath a series of polishing units.

The primary object of the present invention, is to provide a lay-out of the continuous type for surfacing sheet glass, improved means for driving or propelling the trucks or tables employed therein.

Another important object of the invention is to provide in such a continuous system for surfacing sheet glass including a working track and a return track, means for propelling the trucks or tables along said return track.

A further object is to provide in such a continuous system for surfacing sheet glass including a working track and a return track, a traveling cable positioned in proximity to the return track, and means carried by the tracks or tables for gripping said cable to effect movement of the tables along said track.

Still another object is to provide such a continuous system for surfacing sheet glass wherein the traveling cable arranged in proximity to the return track is preferably trained about sheaves or pulleys, means being provided for causing the gripping means carried by the trucks and engaging the cable to be moved out of the path of said sheaves or pulleys during the travel of said tables along the return track.

Other objects and advantages of the invention will become more apparent during the course of the following description when taken in connection with the accompanying drawings.

In the drawings forming a part of this application and wherein like numerals are employed to designate like parts throughout the same, Fig. 1 is a diagrammatic plan view of a layout embodying the present invention.

Fig. 2 is a side elevation of the apparatus for propelling the tables along the return track.

Fig. 3 is an end view of one of the tables showing the apparatus for propelling said tables along the working track.

Fig. 4 is a diagrammatic plan view of the apparatus for moving the gripping means out of the path of the sheaves or pulleys during the travel of the tables along the return track.

Fig. 5 is an enlarged side elevation of the gripping means, and

Fig. 6 is an end view thereof.

In the drawings, 10 designates a plurality of trucks or tables mounted on wheels 11 and adapted to run on a preferably endless track arrangement designated in its entirety by the numeral 12, said track arrangement consisting of a working portion or track 13 and a return portion or track 14 arranged substantially parallel therewith, the opposite ends of said working track and return track being connected by the curved loop portions 15 and 16. Arranged above the working track 13 are a series of grinding units 17 and a series of polishing units 18.

The tables 10 have rigid beds upon which the sheets of glass 19 to be surfaced may be secured in any preferred or well known manner, the said tables being adapted to carry the sheets first beneath the grinding units 17 and then beneath the polishing units 18. For the purpose of driving the tables beneath the surfacing units 17 and 18, each of said tables may be provided upon the underside of its bed and adjacent its opposite side edges with racks 20 and 21 engageable by drive pinions 22 and 23 connected with and driven from any suitable source of power. These drive pinions are preferably located at the forward end of the grinding units 17 in order to propel the tables forwardly.

The present invention relates especially to the provision of novel means for driving the tables along the return track 14 and to this end, there is arranged beneath said return track 14 a preferably endless cable 24 trained at the opposite ends of its loop around sheaves or pulleys 25 and 26 with the upper run thereof supported intermediate its ends upon one or any desired number of sheaves or pulleys 27. The sheave or pulley 26 is adapted to be positively driven in any desired manner such as by means of a sprocket 28 and sprocket chain 29, said sprocket chain being connected to any suitable driving mechanism.

Secured to the underside of each table at approximately the center thereof are spaced transverse bearings 30 and 31 between which may be positioned a substantially T-shaped coupling 32 having threaded within its oppositely disposed arms trunnions 33 and 34 rotatably received within the bearings 30 and 31 respectively. Threaded within the lateral arm of the T-coupling 32 is one end of a member 35 having its opposite end bifurcated to provide the spaced portions 36. Received between these portions and pivotally mounted upon a pivot pin 38 is one end of the gripping member 39, said member being formed with a hook 40 adapted to engage the cable 24, said hook being provided with a downwardly projecting arm 41 for a purpose to be more clearly hereinafter apparent. In accordance with the construction disclosed, the gripping member 39 is adapted to swing in a vertical arc longitudinally of the table about the pivot point defined by the trunnions 33 and 34 and in a vertical arc transversely of the table about the pivot pin 38.

In operation, the sheets of glass to be surfaced are first secured in any preferred or well known manner to the tops of the tables or trucks 10 and then carried thereby first beneath the grinding units 17 and then beneath the polishing units 18 to finish one side thereof, said tables being propelled along the working track by means of the drive pinions 22 and 23 engaging the racks 20 and 21 on the underside of said tables. As the tables pass beyond the polishing units 18, they are moved around the loop 15 either manually or by some suitable power operated means and as the tables are run onto the return track 14, the hooks 40 carried thereby will pass over or embrace the cable 24, said cable being received within the hooks as clearly shown in Fig. 6.

When the gripping member first moves to embrace the cable, it is in a vertical position as indicated by the dotted lines in Fig. 5 but upon continued movement of the cable, the friction between the hook and cable will cause the hook to swing forwardly in a vertical arc longitudinally of the table to the position shown by the full lines so that the said member will firmly grip the cable. Consequently, since the cable is being positively driven, the cars will be drawn thereby along the return track.

The cable can be extended around the end portions 15 and 16 of the tracks if desired so as to pull the tables around said end portions. Also, the present invention is not to be restricted for use only in connection with the particular track arrangement disclosed since it may be used just as efficiently in various other track systems. During the travel of the tables along the return track 14, the sheets carried thereby are adapted to be removed therefrom, turned over and again secured thereto so that as the tables leave the return track 14 they will be pushed around the loop portion 16 and again passed beneath the grinding and polishing units to finish the second side of the sheet. After this operation, and during the next travel of the tables along the return track, the finished sheets are removed from the tables and other sheets to be surfaced secured thereto.

The present invention also contemplates means for effecting movement of the gripping members out of the path of the sheaves or pulleys as the tables pass thereover if desired. In order that this might be accomplished, there may be provided adjacent any one or all of the sheaves or pulleys a cam track 42 extending longitudinally of the cable and being outwardly bowed with respect thereto as clearly shown in Figure 4, the opposite ends of the cam track being relatively close to and substantially parallel with said cable. As the tables approach the pulley, the arm 41 of the gripping member 39 will ride up on the cam track 42 as shown in Fig. 6 so as to swing said gripping member in a vertical arc transversely of the table out of the path of the pulley. During the disengagement of the hook of any one car from the cable, the cars following this car will serve to push the same forwardly until it has passed over the pulley and as the arm 41 leaves the opposite end of the cam track, the hook will again engage the cable to drive the car.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. Means for driving a series of glass supporting tables along a track including an endless traveling cable extending longitudinally of and associated with the track, rotatable members about which the cable is trained and by means of which it is supported, a cam track arranged adjacent said cable, a gripping member pivotally carried by each table and including a substantially horizontally disposed hook portion adapted to grip the cable to effect movement of said table along said track, said hook portion being of integral construction, and means carried by said gripping member and adapted to ride up on the cam track to swing said hook portion bodily in a vertical arc transversely of the table out of the path of the rotatable members as said truck is passed by the same, said gripping member adapted to be automatically moved to again engage the cable after said table has passed the rotatable member.

2. Means for driving a series of glass supporting tables including a traveling cable, a gripping member pivotally carried by each table and including a substantially horizontally disposed hook portion adapted to frictionally grip the cable to effect movement of said table, said hook portion being of integral construction, and a fixed means disposed in the course of travel of said gripping member and engageable thereby for swinging the hook portion bodily transversely of the table to disengage it from said cable.

3. Means for driving a series of glass supporting tables including a traveling cable, a gripping member pivotally carried by each table and including a substantially horizontally disposed hook portion adapted to frictionally grip the cable to effect movement of said table, said hook portion being of integral construction, and a fixed means disposed in the course of travel of said gripping member and engageable thereby for swinging the hook portion bodily in a vertical arc transversely of the table to disengage it from said cable, said fixed means being constructed to permit the automatic return of the gripping member into engagement with the cable upon continued movement of said table.

4. Means for driving a series of glass supporting tables including a traveling cable, a gripping member carried by each table and including a substantially horizontally disposed hook portion adapted to frictionally grip the cable to effect movement of said table, said hook portion being of integral construction, a cam track arranged in the course of travel of the table and adapted to swing the hook portion bodily in a vertical arc transversely of said table to disengage it from said cable.

5. Means for driving a series of glass supporting tables along a track including a traveling cable extending longitudinally of and associated with the track, a cam track adjacent said cable, a gripping member pivotally carried by each table and including a substantially horizontally disposed hook portion adapted to frictionally grip the cable to effect movement of said table along said track, said hook portion being of integral construction, and means carried by said gripping member and adapted to ride upon the cam track to swing said hook portion bodily in a vertical arc transversely of the table to disengage it from said cable.

6. Means for driving a series of glass supporting tables including a traveling cable, and a gripping member pivotally carried by each table and adapted to engage the cable to effect movement of said table, said gripping member being pivoted to swing in two directions at substantially right angles relative to one another.

7. Means for driving a series of glass supporting tables including a traveling cable, and a gripping member pivotally carried by each table and adapted to engage the cable to effect movement of said table, said gripping member being pivoted to swing in a vertical arc longitudinally of the cable and also in a vertical arc transversely of said cable.

8. Means for driving a series of glass supporting tables, including a traveling cable, and a gripping member pivotally carried by each table to swing in a vertical arc longitudinally of the cable and also in a vertical arc transversely of said cable, said gripping member having a substantially horizontally disposed hook portion adapted to straddle the cable and frictionally engage the same to effect movement of the table.

9. Means for driving a series of glass supporting tables, including a traveling cable, and a gripping member pivotally carried by each table to swing in a vertical arc longitudinally of the cable and also in a vertical arc transversely of said cable, said gripping member having a substantially horizontally disposed hook portion adapted to straddle the cable and frictionally engage the same to effect movement of the table, and an arm carried by the gripping member and by means of which said member may be swung in a vertical arc transversely of the table to disengage the same from said cable.

Signed at Toledo, in the county of Lucas, and State of Ohio, this 17th day of August, 1927.

INGVALD O. PEDERSEN.
ERIK G. STAHLE.